United States Patent [19]

Hatano

[11] Patent Number: 4,779,699
[45] Date of Patent: Oct. 25, 1988

[54] FOUR WHEEL DRIVE VEHICLE WITH INTER-AXLE DIFFERENTIAL HAVING DUAL PLANETARY GEAR SETS

[75] Inventor: Mitsuru Hatano, Hiroshima, Japan

[73] Assignee: Mazda Motor Corporation, Hiroshima, Japan

[21] Appl. No.: 42,809

[22] Filed: Apr. 27, 1987

[30] Foreign Application Priority Data

Apr. 30, 1986 [JP] Japan ................................ 61-99820
Apr. 30, 1986 [JP] Japan ................................ 61-99821

[51] Int. Cl.$^4$ ......................................... B60K 17/348
[52] U.S. Cl. ...................... 180/248; 74/695; 74/701; 74/740
[58] Field of Search ........... 180/248, 249, 250, 247, 180/233, 297; 74/710.5, 714, 710, 700, 701, 705, 695, 681, 682, 740

[56] References Cited

U.S. PATENT DOCUMENTS

| | | | |
|---|---|---|---|
| 4,074,591 | 2/1978 | Dick | 74/710.5 |
| 4,417,642 | 11/1983 | Suzuki | 180/297 |
| 4,589,304 | 5/1986 | Ashikawa | 74/714 |
| 4,644,822 | 2/1987 | Batchelor | 74/710.5 |
| 4,650,202 | 3/1987 | Tsuzuki | 74/714 |
| 4,677,873 | 7/1987 | Eastman | 74/740 |
| 4,677,875 | 7/1987 | Batchelor | 180/248 |

FOREIGN PATENT DOCUMENTS

| | | |
|---|---|---|
| 0177286 | 4/1986 | European Pat. Off. |
| 56-122630 | 9/1981 | Japan . |
| 61-62641 | 3/1986 | Japan . |

Primary Examiner—John J. Love
Assistant Examiner—Everett G. Diederiks, Jr.
Attorney, Agent, or Firm—Fleit, Jacobson, Cohn & Price

[57] ABSTRACT

A four wheel drive vehicle including a front inter-wheel differential gear between front drive axles, a rear inter-wheel differential gear between rear drive axles and an inter-axle differential gear between the front and rear drive axles. The vehicle has a transmission arranged with its output axis transversely of the vehicle. The inter-axle differential gear includes two planetary gear sets which are mounted on one of the front drive axles and provided with clutches so that the planetary gear sets are selectively brought into an operative position.

15 Claims, 7 Drawing Sheets

FOUR WHEEL DRIVE VEHICLE WITH INTER-AXLE DIFFERENTIAL HAVING DUAL PLANETARY GEAR SETS

BACKGROUND OF THE INVENTION

1. Field of the Invention

The present invention relates to a four-wheeled motor vehicle and more particularly to a four wheel drive motor vehicle. More specifically, the present invention pertains to a driving torque distribution mechanism for a four wheel drive motor vehicle.

2. Description of the Prior Art

In a four wheel drive motor vehicle, it has been proposed to control the ratio of the torque distribution between the front and rear drive axles. For example, the Japanese utility model disclosure No. 56-122630 teaches to locate a slip clutch such as a wet type clutch or a fluid coupling in the torque transmitting path to the front and/or rear driving wheels. Where a wet type clutch is used, the torque to be transmitted through the clutch can be controlled by an adjustment of the engagement pressure between a pair of friction discs. In case where a fluid coupling is used, the torque to be transmitted through the coupling is controlled by an adjustment of the hydraulic pressure in the coupling.

In the Japanese patent disclosure No. 61-62641, there is disclosed another type of torque distribution mechanism. In the mechanism proposed by the Japanese patent disclosure, a plurality of differential gear mechanisms are provided in parallel in the torque transmitting path to the front and rear wheels and a selecting mechanism is provided to selectively bring one of the differential gear mechanisms into an operative position. The system as proposed by the Japanese patent disclosure is considered as preferable in respect to reliability and durability. It should however be noted that the structure as disclosed is not suitable for a vehicle having a transmission output axis arranged transversely with respect to the vehicle body.

SUMMARY OF THE INVENTION

It is an object of the present invention to provide a four wheel drive vehicle having a torque distribution mechanism for controlling the torque distribution between the front and rear drive axles, which is simple and compact in structure.

Another object of the present invention is to provide a torque distribution mechanism which is suitable for a four wheel drive vehicle having a transmission axis arranged transversely with respect to the vehicle body.

A further object of the present invention is to provide a torque distribution mechanism for a four wheel drive vehicle which is reliable even under prolonged use.

According to the present invention, the above and other objects can be accomplished by a four wheel drive vehicle including a first pair of wheels connected respectively with a pair of first drive axles to be driven thereby, first inter-wheel differential means provided between said first drive axles, a second pair of wheels connected respectively with a pair of second drive axles to be driven thereby, second inter-wheel differential means provided between said second drive axles, power transmission means having output means with an output axis arranged transversely, torque distribution means provided for transmitting an output torque from the transmission means to said first and second inter-wheel differential means, said torque distribution means comprising inter-axle differential means including a plurality of sets of planetary gear means having different torque split ratios and arranged in parallel with each other, selecting means for selectively bringing one of the sets of planetary gear means into an operative position wherein the output torque from the transmission means is transmitted through the selected set of the planetary gear means to the first and second inter-wheel differential means with the torque split ratio of said selected set of the planetary gear means, said planetary gear means and said selecting means being arranged coaxially with said first inter-wheel differential means, one of said first drive axles being passed through said planetary gear means and said selecting means.

According to the features of the present invention, the inter-axle differential means includes a plurality of sets of planetary gear means and the planetary gear means are provided coaxially on one of the wheel drive axles. It is therefore possible to make the overall arrangement compact. Since the torque distribution means is constituted totally by gear mechanisms, a reliable and durable torque distribution mechanism is obtained.

The above and other objects and features of the present invention will become apparent from the following descriptions of preferred embodiments taking reference to the accompanying drawings.

DESCRIPTION OF THE PREFERRED EMBODIMENT

Figure 1:
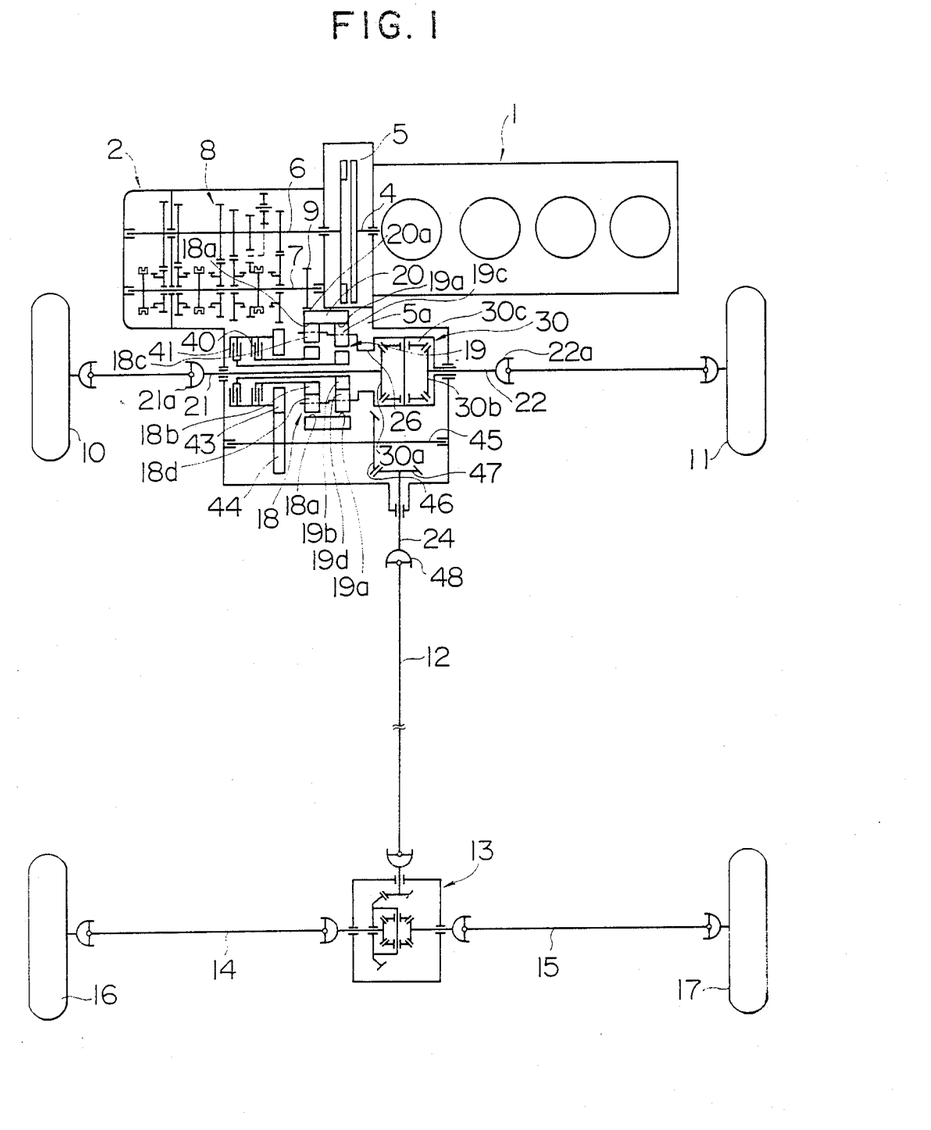
FIG. 1 is a diagrammatical plan view of a vehicle four wheel driving system in accordance with one embodiment of the present invention.
Figure 1A:
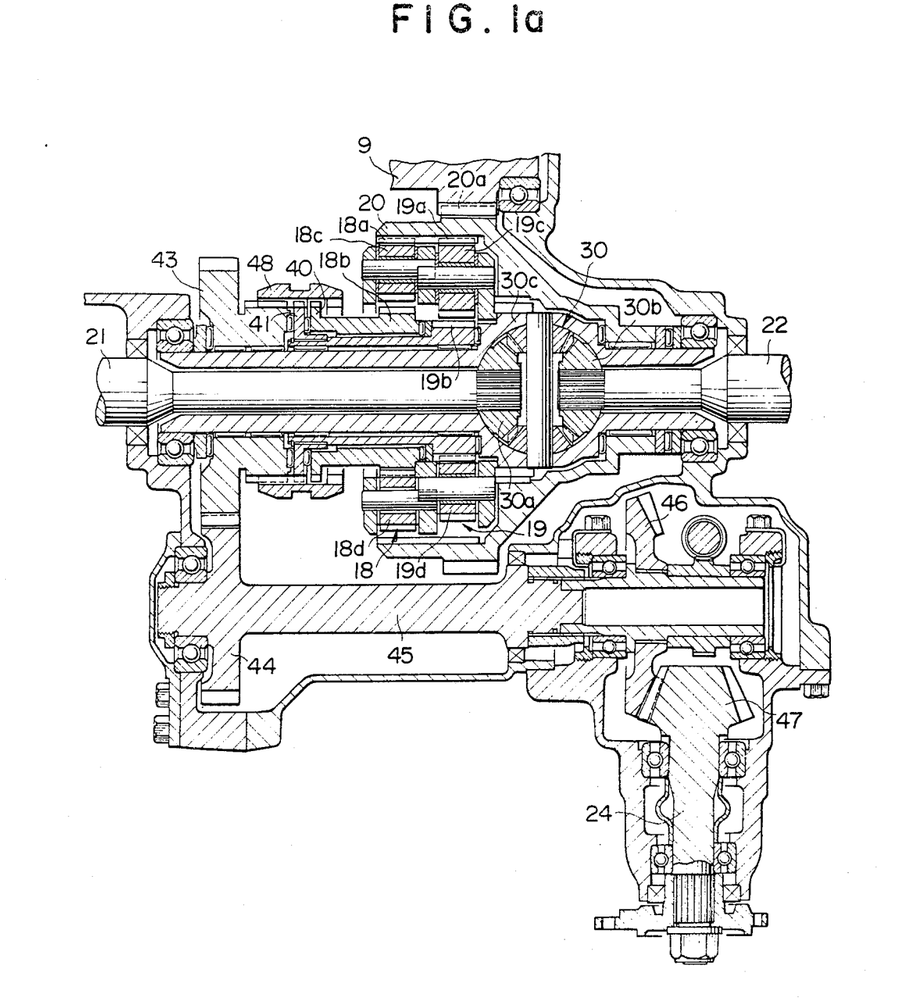
FIG. 1a is a sectional view showing the structural arrangement of the inter-axle differential gear mechanism in the embodiment of FIG. 1.

Referring now to the drawings, particularly to FIGS. 1 and 1a, there is shown a vehicle including front wheels 10 and 11 and rear wheels 16 and 17. An engine 1 is provided and has an output shaft 4 which is arranged with the axis extending transversely with respect to the vehicle body. The output shaft 4 of the engine 1 is connected through a clutch 5 with a transmission 2 which has an input shaft 6 and an output shaft 7. It will be noted that the shafts 6 and 7 are arranged in parallel with each other and extend in a transverse direction with respect to the vehicle body. A plurality of sets of transmission gears 8 are provided on the shafts 6 and 7 is well known in the art. The output shaft 7 carries an output gear 9.

The front wheels 10 and 11 are respectively connected with front drive axles 21 and 22 which have universal joints 21a and 22a respectively. The front axles 21 and 22 are connected with output gears 30a and 30b of an inter-wheel differential gear assembly 30. On the drive axle 21, there are provided two sets of planetary gear mechanisms 18 and 19 which include internal gears 18a and 19a, respectively formed on a common ring member 20. The ring member 20 has an external gear 20a which is in meshing engagement with the output gear 9 on the transmission output shaft 7. The first planetary gear set 18 has a sun gear 18b which is coaxial with and mounted on the drive axle 21. Between the internal gear 18a and the sun gear 18b, there are provided planetary pinions 18c and 18d.

Similarly, the second planetary gear set 19 includes a sun gear 19b which is coaxial with and mounted on the drive axle 21. Planetary pinions 19c and 19d are provided between the internal gear 19a and the sun gear 19b. The planetary pinions 18c, 18d, 19c and 19d are carried by a pinion carrier 26 which is connected with an input member 30c of the inter-wheel differential gear 30.

As shown in FIGS. 1 and 1a, the sun gear 19b of the second gear set 19 is mounted on the front drive axle 21. The sun gear 18b of the first gear set 18 is mounted on a shaft which is coaxially connected with the sun gear 19b in the second gear set 19. It will therefore be understood that the first and second gear sets 18 and 19 are coaxial with each other and mounted on the front drive axle 21 which passes through the planetary gear sets 18 and 19. The sun gear 18b of the first planetary gear set 18 is arranged so that it can be connected through a first clutch 40 with a rear wheel drive gear 43 which is located at the transversely outer side of the planetary gear sets 18 and 19 and mounted on the shaft connected with the sun gear 18b of the first gear set 18. The gear 43 is in meshing engagement with a gear 44 provided on a rear output shaft 45. The sun gear 19b of second planetary gear set 19 is arranged so that it can be connected through a second clutch 41 with the rear wheel drive gear 43. The rear output shaft 45 has a bevel gear 46 which is in engagement with a bevel gear on a propeller shaft 24. The propeller shaft 24 is connected through a universal joint 48 with a propeller shaft 12. In order to selectively connect the clutches 40 and 41 with the rear wheel drive gear 43, there is provided a clutch sleeve 48 which is axially slidably movable to either of a first position wherein it connects the clutch 40 with the gear 43, a second position wherein it connects the clutch 41 with the gear 43 or a third position wherein it connects both of the clutches 40 and 41 with the gear 43.

The rear wheels 16 and 17 are respectively connected with drive axles 14 and 15 which are in turn connected with a rear inter-wheel differential gear 13. The propeller shaft 12 is connected with the rear inter-wheel differential gear 13. It will be understood that the planetary gear sets 18 and 19 constitutes a torque split mechanism which determines the ratio of the torque to be transmitted to the front drive axles 21 and 22 to the torque to be transmitted to the rear drive axles 14 and 15.

The first gear set 18 and the second gear set 19 have different gear ratios so that the torque split ratio by the first gear set 18 is different from that by the second gear set 19. By alternately engaging the clutch 40 or 41, it is possible to change the torque split ratio between the front wheels 10 and 11 and the rear wheels 16 and 17. When both of the clutches 40 and 41 are engaged, the inter-axle differential gear mechanism is locked so that the torque from the transmission is split evenly between the front and rear wheels. When both the clutches 40 and 41 are disengaged, the driving torque is transmitted only to the front wheels 10 and 11.

Figure 2:
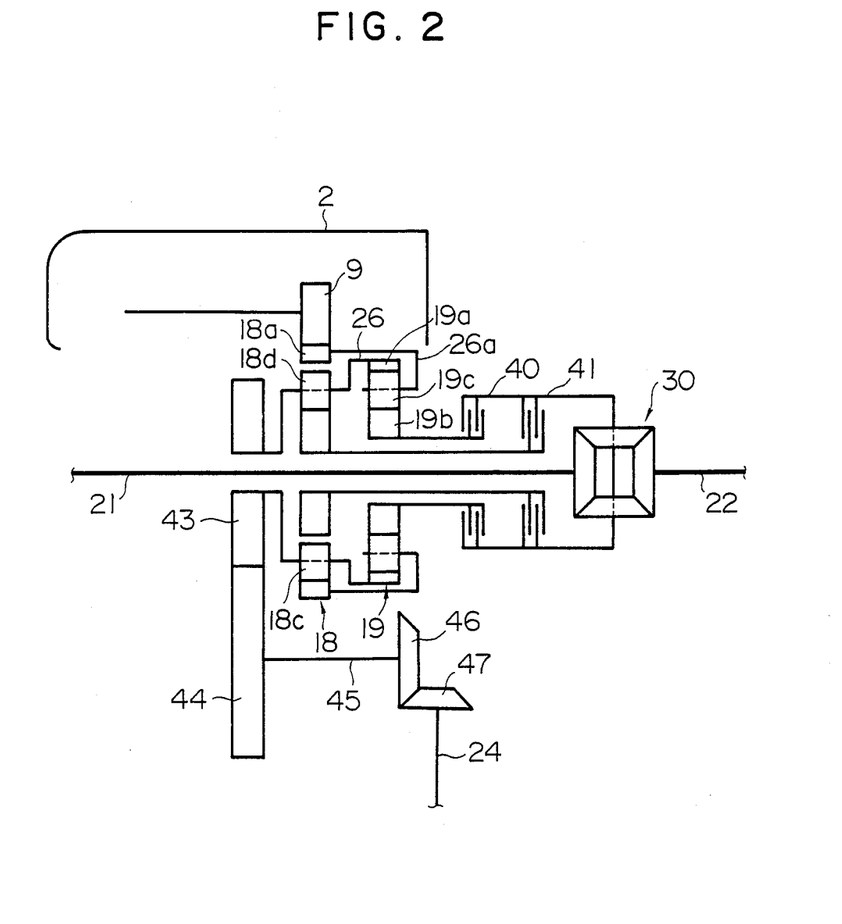
FIG. 2 is a fragmentary plan view of the vehicle drive system in accordance with another embodiment of the present invention.

Referring to FIG. 2, the embodiment shown therein includes a first planetary gear set 18 comprising a ring gear 18a and a sun gear 18b which are coaxial with the front drive shaft 21. Planetary pinions 18c and 18d are provided between the ring gear 18a and 18b and carried by a pinion carrier 26. The ring gear 18a has an external gear teeth which are in meshing engagement with the output gear 9 of the transmission. The second planetary gear set 19 comprises a ring gear 19a and a sun gear 19b which is coaxial with and mounted on the drive axle 21. Planetary pinions 19c are provided between the ring gear 19a and the sun gear 19b. The pinions 19c of the planetary gear set 19 are carried by a pinion carrier 26a which is connected with the sun gear 18a of the first planetary gear set 18. The pinion carrier 26 of the first planetary gear set 18 is connected on one hand with the ring gear 19a of the second planetary gear set 19 and on the other hand with an output gear 43 rotatable on the drive axle 21. The output gear 43 is engaged with the gear 44 on the output shaft 45 as in the previous embodiment.

The sun gear 18b of the first gear set 18 is connected through a clutch 40 with an input member of a front inter-wheel differential gear 30. The differential gear 30 has output members connected with the drive axles 21 and 22, respectively. The function of this embodiment is the same as that of the previous embodiment except that only the rear wheels will be driven when the clutches 40 and 41 are disengaged.

Figure 3:
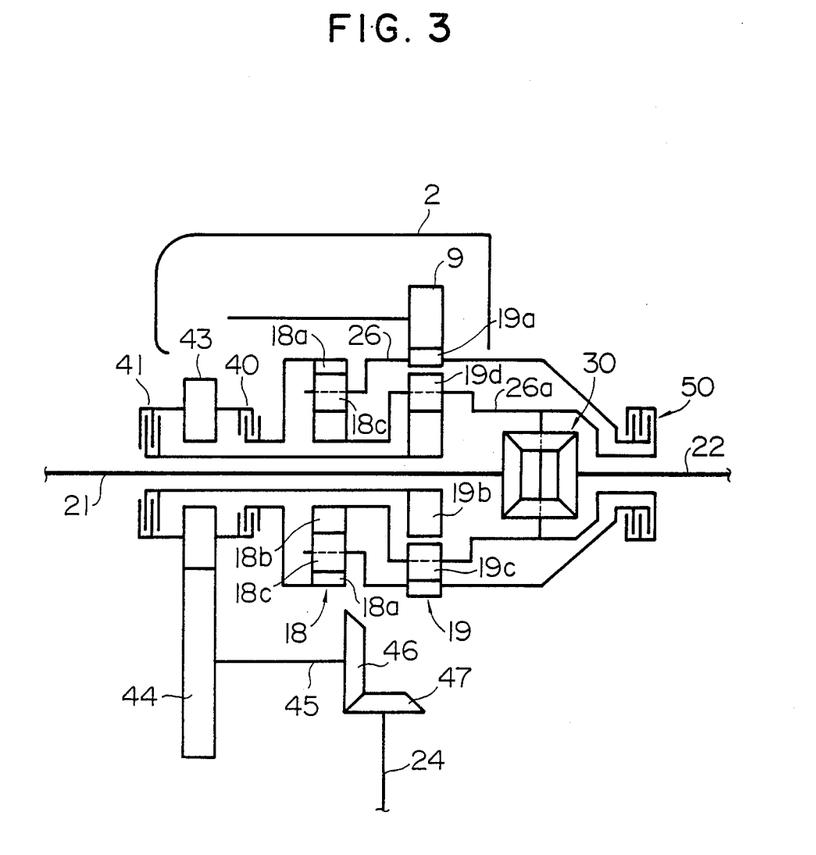
FIG. 3 is a fragmentary plan view similar to FIG. 2 but showing a further embodiment.

Referring to FIG. 3, it will be noted that in this embodiment the first planetary gear set 18 includes a ring gear 18a and a sun gear 18b which are engaged with common pinion gears 18c. The pinions 18c are carried by a pinion carrier 26. The second planetary gear set 19 includes a ring gear 19a, a sun gear 19b and pinions 19c and 19d between the ring gear 19a and the sun gear 19b. The pinions 19c and 19d of the second gear set 19 are carried by a pinion carrier 26a. The ring gear 19a is formed with external gear teeth which are in meshing engagement with the output gear 9 of the transmission. The sun gears 18a and 19a are coaxial with and mounted on the front drive axle 21. The planetary carrier 26 of the first gear set 18 is connected with the ring gear 19a of the second gear set 19. The planetary carrier 26a of the second gear set 19 is connected with the sun gear of the first gear set 18.

The ring gear 18a of the first gear set 18 is connected through a first clutch 40 with the rear drive gear 43. The sun gear 19b of the second gear set 19 is connected through a second clutch 41 with the gear 43. The planetary carrier 26a of the second gear set 19 is connected with input members of the front inter-wheel differential gear mechanism 30. It will be noted that in this embodiment a differential lock clutch 50 is provided between the sun gear 19a of the second gear set 19 and the planetary carrier 26a to lock the inter-axle differential gear mechanism.

Figure 4:
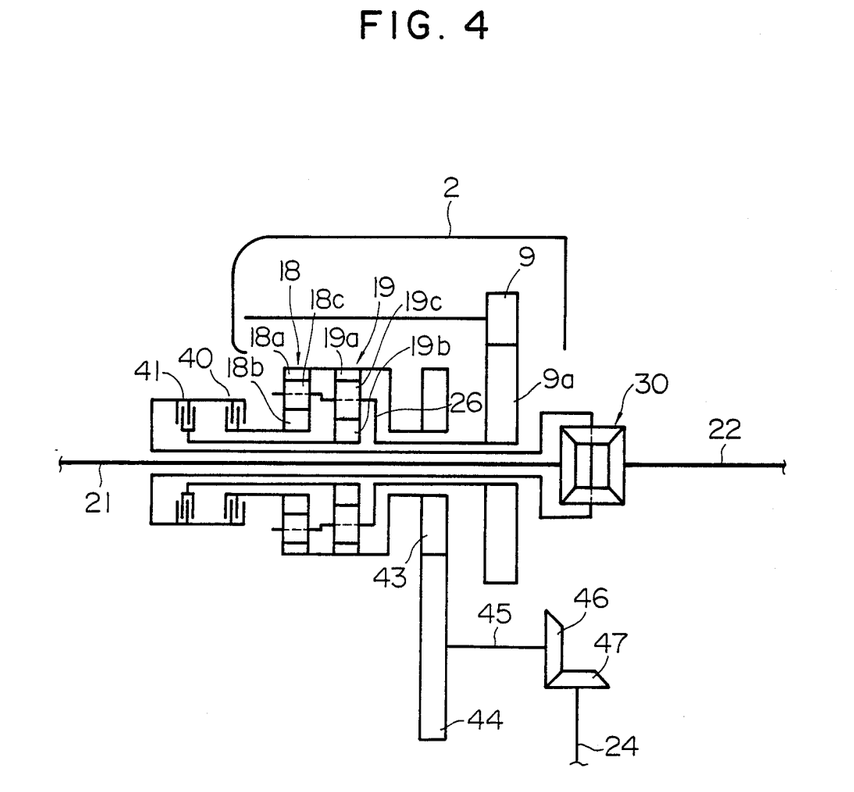
FIG. 4 is a view similar to FIG. 2 but showing a further different embodiment.

Referring to FIG. 4, it will be noted that in this embodiment the first planetary gear set 18 includes a ring gear 18a and a sun gear 18b which are in engagement with common planetary pinions 18c. The second planetary gear set 19 includes a ring gear 19a and a sun gear 19b which are engaged with common planetary pinions 19c. The pinions 18c and 19c are carried by a common planetary carrier 26 which is connected with a driven gear 9a engaged with the output gear 9 of the transmission. The ring gears 18a and 19a are connected with the rear driving gear 43 which is located in this embodiment at the transversely inner side with respect to the planetary gear sets 18 and 19. The sun gears 18b and 19b are connected through clutches 40 and 41, respectively, with input gears of the front inter-wheel differential gear mechanism 30.

Figure 5:
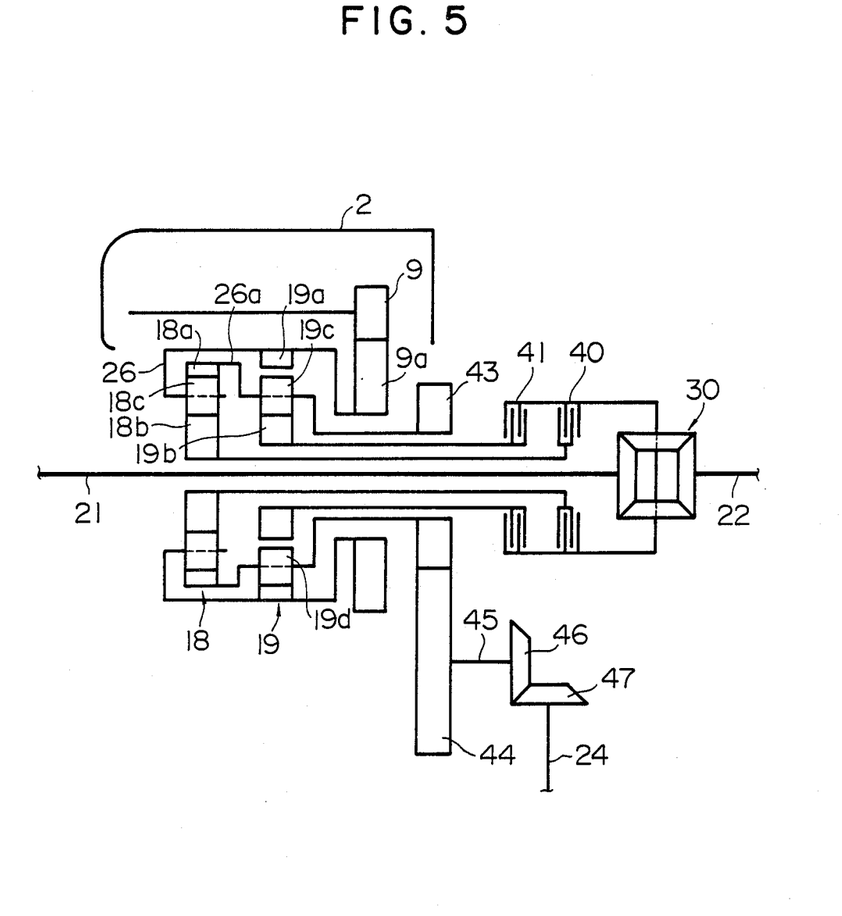
FIG. 5 is a view showing a further different embodiment.

Referring to FIG. 5, the embodiment shown therein includes a first planetary gear set 18 comprising a ring gear 18a and a sun gear 18b engaged with common planetary pinions 18c. There is further provided a second planetary gear set 19 comprising a ring gear 19a, a sun gear 19b and planetary pinions 19c and 19d between the ring gear 19a and the sun gear 19b. The pinions 18c are carried by a pinion carrier 26 whereas the pinions 19c and 19d are carried by a pinion carrier 26a.

In the embodiment, the ring gear 19a of the second gear set is connected with a driven gear 9a which is mounted on the front axle 21 and engaged with the output gear 9 of the transmission 2. The planetary carrier 26 of the first gear set 18 is connected with the sun gear 19b of the second gear set 19. The planetary carrier 26a of the second gear set 19 is connected with the rear drive gear 43 engaged with the output gear 44. The sun gear 18b of the first gear set 18 is connected through a first clutch 40 with the input members of the front inter-wheel differential gear mechanism 30. The sun gear 19b of the second gear set 19 is connected through a second clutch 41 with the input members of the differential gear mechanism 30. The operations are the same as those of the previous embodiments.

Figure 6:
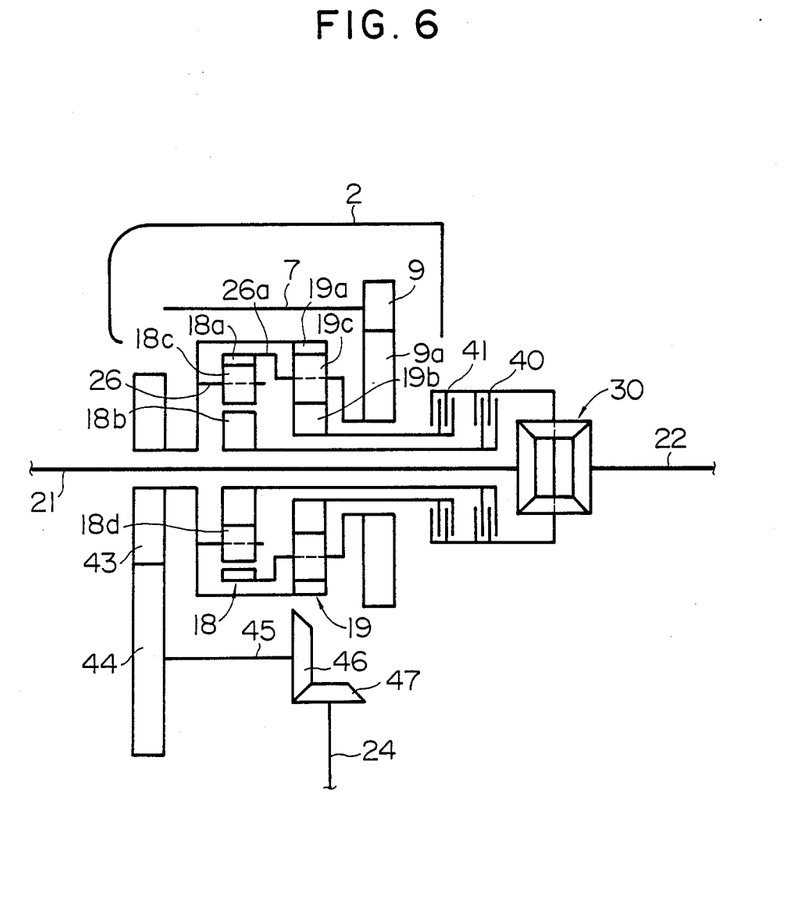
FIG. 6 is a view showing a further embodiment.

Referring to FIG. 6, there is shown a further embodiment in which the first planetary gear set 18 includes a ring gear 18a, a sun gear 18b and planetary pinions 18c and 18d which are positioned between the ring gear 18a and the sun gear 18b. The second planetary gear set 19 includes a ring gear 19a and a sun gear 19b which are engaged with planetary pinions 19c located between the ring gear 19a and the sun gear 19b. The sun gear 18b of the first gear set 18 is mounted on the front driving axle 21 and the sun gear 19b of the second gear set 19 is mounted on a shaft which is coaxial with and connected with the sun gear 18b. Thus, the second gear set 19 is coaxial with the first gear set 18 and located laterally inside with respect to the first gear set 18. The pinions 18c and 18d in the first gear set 18 are carried by a pinion carrier 26 and the pinions 19c in the second gear set 19 are carried by a pinion carrier 26a. The pinion carrier 26 is connected with the ring gear 19a of the second gear set 19. The pinion carrier 26a is connected with the ring gear 18a of the first gear set 18.

At the transversely inner side of the second gear set 19, there is a driven gear which is mounted on a shaft which is coaxial with and connected with the sun gear 19b of the second gear set 19. The driven gear 9a is engaged with the output gear 9 in the transmission 2. Further, the driven gear 9a is connected with the pinion carrier 26a of the second gear set 19. At the transversely outer side of the first gear set 18, there is an output gear 43 which is mounted on the front drive axle 21. The output gear 43 is engaged with the output driven gear 44 as in the previous embodiments.

The shaft connected with the sun gear 18b of the first gear set 18 is connected with input members of the front inter-wheel differential gear mechanism 30 through a clutch 40 which is also mounted on the front drive axle 21. The shaft connected with the sun gear 19b is connected with the input members of the front inter-wheel differential gear mechanism 30 through a clutch 41 which is mounted on the shaft connected with the sun gear 18b of the first planetary gear set 18. The operations of the embodiment is the same as those in the previous embodiments.

The invention has thus been shown and described with reference to specific embodiments, however, it should be noted that the invention is in no way limited to the details of the illustrated structures but changes and modifications may be made without departing from the scope of the appended claims.

I claim:

1. A four wheel drive vehicle including a first pair of wheels connected respectively with a pair of first drive axles to be driven thereby, first inter-wheel differential means provided between said first drive axles, a second pair of wheels connected respectively with a pair of second drive axles to be driven thereby, second inter-wheel differential means provided between said second drive axles, power transmission means having output means with an output axis arranged transversely, torque distribution means provided for transmitting an output torque from the transmission means to said first and second inter-wheel differential means, said torque distribution means including inter-axle differential means including a plurality of parallelly arranged sets of planetary gear means having different torque split ratios and output means, selecting means provided between said output means of the inter-axle differential means and one of said first and second inter-wheel differential means for selectively bringing one of the sets of planetary gear means into an operative position wherein the output torque from the transmission means is transmitted through the selected set of the planetary gear means and through said selecting means to said one of the first and second inter-wheel differential means but not transmitted through said selecting means to the other of the first and second inter-wheel differential means with the torque split ratio of said selected set of the planetary gear means, said planetary gear means and said selecting means being arranged coaxially with said inter-wheel differential means, one of said first drive axles being passed through said planetary gear means and said selecting means.

2. A four wheel drive vehicle in accordance with claim 1 which further includes drive gear means coaxial with and located at a side of said torque distribution means, said drive gear means being connected with said torque distribution means to be driven thereby, driven gear means provided on a shaft extending substantially in parallel with said one first drive axle and engaged with said drive gear means, said shaft having bevel gear means for transmitting a driving torque to a longitudinally extending propeller shaft means which is connected with said second inter-wheel differential gear means.

3. A four wheel drive vehicle in accordance with claim 2, in which said selecting means is located adjacent to said drive gear means and said driven gear means.

4. A four wheel drive vehicle in accordance with claim 1 in which said plurality of sets of planetary gear means have a common input member which is directly connected with said output means of the transmission means and a common output member which is directly connected with one of said first and second inter-wheel differential means, said plurality of sets of planetary gear means further having separate output members which are respectively directly connected through said selecting means with the other of said first and second inter-wheel differential means.

5. A four wheel drive vehicle in accordance with claim 1 in which said selecting means is located adjacent to said torque distribution means.

6. A four wheel drive vehicle in accordance with claim 1 in which said selecting means is provided in a torque transmitting path from said torque distribution means to said first inter-wheel differential means, said selecting means being located adjacent to said first inter-wheel differential means.

7. A four wheel drive vehicle in accordance with claim 1 in which one set of planetary gear means has an input member comprised of a ring gear and the other set of planetary gear means has an input member comprised of a pinion carrier.

8. A four wheel drive vehicle in accordance with claim 1 in which said transmission means is located in a front portion of the vehicle, said first inter-wheel differential means being a front differential gear set, said second inter-wheel differential gear means being a rear differential gear set.

9. A four wheel drive vehicle in accordance with claim 1, in which said output means of said transmission means is substantially aligned in a radial direction with one element of said planetary gear means.

10. A four wheel drive vehicle in accordance with claim 1, in which said planetary gear means and said selecting means are arranged on said one of the first drive axles.

11. A four wheel drive vehicle in accordance with claim 1, in which said selecting means is provided on said one of the first drive axles at a side of the planetary gear means opposite to the inter-axle differential means.

12. A four wheel drive vehicle in accordance with claim 1, in which said selecting means is located at an axially offset position with respect to the output means of the transmission means.

13. A four wheel drive vehicle including a pair of front wheels connected respectively with a pair of front drive axles to be driven thereby, a front inter-wheel differential gear mechanism provided between said front drive axles, a pair of rear wheels connected respectively with a pair of rear drive axles to be driven thereby, a rear inter-wheel differential gear mechanism provided between said rear drive axles, power transmission means located in a front portion of said vehicle and having output means with an output axis arranged transversely, torque distribution means provided for transmitting an output torque from the transmission means to said front and rear inter-wheel differential gear mechanism, said torque distribution means comprising inter-axle differential means including a plurality of parallelly arranged sets of planetary gear means having different torque split ratios and output means, selecting means provided between said output means of said inter-axle differential means for selectively bringing one of the sets of planetary gear means into an operative position wherein the output torque from the transmission means is transmitted through the selected set of the planetary gear means and said selecting means to one of the front and rear inter-wheel differential gear mechanism but not transmitted through said selecting means to the other of the front and rear inter-wheel differential gear mechanism with the torque split ratio of said selected set of planetary gear means, said planetary gear means and said selecting means being arranged coaxially with said front inter-wheel differential gear mechanism, one of said front drive axles being passed through said planetary gear means and selected means.

14. A four wheel drive vehicle including a first pair of wheels connected respectively with a pair of first drive axles to be driven thereby, first inter-wheel differential means provided between said first drive axles, a second pair of wheels connected respectively with a pair of second drive axles to be driven thereby, second inter-wheel differential means provided between said second drive axles, power transmission means having output means with an output axis arranged transversely, torque distribution means provided for transmitting an output torque from the transmission means to said first and second inter-wheel differential means, said torque distribution means including inter-axle differential means including a plurality of sets of planetary gear means having different torque split ratios and arranged in parallel with each other, selecting means for selectively bringing one of the sets of planetary gear means into an operative position wherein the output torque from the transmission means is transmitted through the selected set of the planetary gear means to the first and second inter-wheel differential means with the torque split ratio of said selected set of the planetary gear means, said planetary gear means and said selecting means being arranged coaxially with said first inter-wheel differential means, one of said first drive axles being passed through said planetary gear means and said selecting means, said plurality of sets of planetary gear means having a common input member which is connected with said output means of the transmission means and a common output member which is connected with one of said first and second inter-wheel differential means, said plurality of sets of planetary gear means further having separate output members which are respectively connected through said selecting means with the other of said first and second inter-wheel differential means, and at least one of said plurality of sets of planetary gear means having a ring gear which is formed with external gear teeth engaged with said output means of the transmission means.

15. A four wheel drive vehicle including a first pair of wheels connected respectively with a pair of first drive axles to be driven thereby, first inter-wheel differential means provided between said first drive axles, a second pair of wheels connected respectively with a pair of second drive axles to be driven thereby, second inter-wheel differential means provided between said second drive axles, power transmission means having output means with an output axis arranged transversely, torque distribution means provided for transmitting an output torque from the transmission means to said first and second inter-wheel differential means, said torque distribution means including inter-axle differential means including a plurality of sets of planetary gear means having different torque split ratios and arranged in parallel with each other, selecting means for selectively bringing one of the sets of planetary gear means into an operative position wherein the output torque from the transmission means is transmitted through the selected set of the planetary gear means to the first and second inter-wheel differential means with the torque split ratio of said selected set of the planetary gear means, said planetary gear means and said selecting means being arranged coaxially with said first inter-wheel differential means, one of said first drive axles being passed through said planetary gear means and said selecting means, said plurality of sets of planetary gear means having a common input member which is connected with said output means of the transmission means and a common output member which is connected with one of said first and second inter-wheel differential means, said plurality of sets of planetary gear means further having separate output members which are respectively connected through said selecting means with the other of said first and second inter-wheel differential means, and said plurality of sets of planetary gear means having a common member providing ring gears for the planetary gear means, said common member being formed with external gear teeth engaged with said output means of the transmission means.

* * * * *